Patented May 29, 1928.

UNITED STATES PATENT OFFICE.

LAZAR EDELEANU, OF BERLIN-CHARLOTTENBURG, GERMANY, ASSIGNOR TO ALLGEMEINE GESELLSCHAFT FUR CHEMISCHE INDUSTRIE, OF BERLIN, GERMANY.

CATALYZER FOR MANUFACTURE OF LIGHT HYDROCARBONS.

No Drawing. Original application filed January 20, 1925, Serial No. 3,684, and in Germany December 19, 1924. Divided and this application filed February 23, 1926, Serial No. 90,150.

The present invention refers to the manufacture of an agent for accelerating and facilitating the manufacture of light hydrocarbons having low boiling points, from heavy hydrocarbons of mineral oils.

The mineral oils contain two classes of hydrocarbons which are distinguished from each other by their solubility in several solvents, of which I cite especially in liquefied sulphurdioxide. I have found that aluminumchloride gives with certain hydrocarbons, preferably purified by liquefied sulphurdioxide, at low temperatures up to about 80° C. a double compound of aluminumchloride with hydrocarbons, which compound constitutes a viscous oil, generally of brownish-yellow color. The said oily compound can readily be separated from the part of the hydrocarbons which has not reacted by decantation.

The oily compound, designated in the present specification as the "double compound" maintains its liquid state even at low temperatures. If one adds gradually or successively the oily double compound to the heavy hydrocarbons to be converted, preferably heated to the reaction temperature (from about 150° C. to the temperature at which no more condensible gases are formed) an equal reaction with the conversion into low boiling hydrocarbons (for instance formation of gasoline from gas oils) occurs without formation of appreciable amounts of difficulty condensible gases and evolution of hydrochloric acid. If one takes as raw materials only the hydrocarbons of the class that are insoluble in liquefied sulphurdioxide, it is possible to convert substantially the whole treated volume into lighter hydrocarbons.

The double compound with aluminumchloride with the hydrocarbons, purified by liquefied sulphurdioxide, is distinguished from similar compounds with the substances soluble in liquefied sulphurdioxide. My double compound is liquid at ordinary or low temperature, does not adhere to the walls of the glass vessels, flows off readily from surfaces of vessels and flows through narrow pipes. By the action of water it is decomposed to aluminumcompounds and hydrocarbons. In contradistinction to this, the compound of aluminumchloride with the mineral oil hydrocarbons and other substances soluble in liquefied sulphurdioxide, as at the normal, i. e., at ordinary temporary temperature or below, resinous, sticky and adhesive, adheres to the walls of glass vessels, does not flow through narrow pipes and gives with water besides aluminumcompounds resinous and asphaltic products, which interfere with the operation and the efficiency of the double aluminumchloride compound as a reagent.

The conversion of the heavy mineral oil hydrocarbons into lighter hydrocarbons having lower boiling points, by means of my double compounds, gives a regular reaction and has the advantage of requiring only a little addition of the agent to the hydrocarbons to be converted and of causing the conversion quickly at a relatively low temperature. Especially, it is possible to add to the bulb of the hydrocarbons to be converted by gradually adding new amounts of the double compound and new portions of the mineral oils so long as the formed lighter hydrocarbons continue to distill off.

The preparation of the double compound of aluminumchloride with the hydrocarbons, purified by liquefied sulphurdioxide is illustrated by the following examples:

To 100 parts by weight of a Californian gas oil, specific gravity (0.875), which has been previously purified by treating it with liquefied sulphurdioxide in quantity sufficient to dissolve constituents to be separated and dissolving constituents of the same therein, separating the two liquids and separating the sulphurdioxide from the purified gasoil (see my United States Patent No. 911,553, February 2, 1909) or by other suitable solvents or a refining process, there are added twenty to fifty parts by weight of aluminumchloride, free of water, and preferably with agitation. The proportions mentioned are not restrictive for all cases. The mixture may be prepared at gentle heat, for instance at 30 to 90 degrees centigrade, although higher temperature may be applied, if it is below that at which a conversion of the heavy hydrocarbons begins. The added aluminumchloride disappears and the formation of a double compound of the appearance of a brownish-yellow oil results. After this and, if desired, after short standing or gentle heating, this brownish-yellow oil may be separated out of the hydrocarbons which have not reacted, for instance by decantation. The double compound or "brown-oil" may be used, either immediately after its preparation or after storage, for the conversion of the heavy hydrocarbons.

The gasoil, used for the preparation of the double compound, should be dry, i. e., free from moisture, even in traces, and free from substances which decompose aluminumchloride, for instance of sulphurdioxide. The proportions cited above may be varied in wide measure. Instead of gasoil one may use also other mineral oils or their fractions freed of the parts soluble in liquefied sulphurdioxide. The removal of the parts soluble in liquefied sulphurdioxide may be effected either by treatment with liquefied sulphurdioxide, or by extraction with other solvents, as for instance alcohols (ethyl-methyl-amyl-etc.) or by suitable refining processes, as by means of sulphuric acid and subsequent treatment with alkalies.

My new double compound is suitable for the manufacture of light hydrocarbons having low boiling points, from heavy hydrocarbons of mineral oils by heating the said heavy hydrocarbons with the double compound. This process is the object of my copending application Serial No. 3684 filed Jan. 20, 1925, of which the present application is a division.

I claim:

1. The process for preparing an agent for converting mineral oils into light oils of lower boiling point which consists in mixing mineral oils with liquefied sulphurdioxide, separating the undissolved constituents of the said mineral oils from the constituents dissolved in liquefied sulphurdioxide, dissolving aluminumchloride in the said undissolved constituents of mineral oils at temperatures below those at which the mineral oils are converted into lighter hydrocarbons and separating the hydrocarbons from the formed oil.

2. In the process for preparing an agent for converting mineral oils into light oils of lower boiling point by action of aluminumchloride on hydrocarbons, the preliminary treatment comprising purification of the oil with liquefied sulphurdioxide before treating it with aluminumchloride.

3. An agent for converting the mineral oils into light hydrocarbons, composed of the mineral oils deprived of the constituents soluble in liquefied sulphurdioxide and aluminumchloride dissolved therein, liquid at normal temperature, flowing off from surfaces and sufficiently fluid to flow through narrow pipes.

4. A reagent for converting mineral oils into light hydrocarbons of lower boiling point, consisting of the brown-oil formed by treating the saturated hydrocarbons of mineral oils with aluminumchloride at normal temperature, containing aluminumchloride, liquid at normal temperature, flowing off from surfaces and sufficiently fluid to flow through narrow pipes.

5. A reagent for converting mineral oils into light hydrocarbons of lower boiling point, consisting of the brown-oil formed by treating the saturated hydrocarbons resulting from the refining of mineral oils deprived of the constituents soluble in liquefied sulphurdioxide with aluminumchloride at normal temperature, liquid at normal temperature, flowing off from surfaces and sufficiently fluid to flow through narrow pipes.

In testimony whereof, I have signed my name to this specification.

LAZAR EDELEANU.